（12）United States Patent
Yamazaki (10) Patent No.: US 6,172,742 B1
(45) Date of Patent: Jan. 9, 2001

(54) REFERENCE IRRADIATION BEAM DETECTING APPARATUS

(75) Inventor: Takaaki Yamazaki, Tokyo (JP)

(73) Assignee: Kabushiki Kaisha Topcon, Tokyo (JP)

( * ) Notice: Under 35 U.S.C. 154(b), the term of this patent shall be extended for 0 days.

(21) Appl. No.: 09/196,332

(22) Filed: Nov. 19, 1998

(30) Foreign Application Priority Data

Nov. 19, 1997 (JP) .................................. 9-317913
Nov. 12, 1998 (JP) .................................. 10-321764

(51) Int. Cl.$^7$ ............................. G01C 3/08; G01C 5/06; G01B 11/26
(52) U.S. Cl. ..................... 356/4.08; 356/3.09; 356/141.4
(58) Field of Search .............................. 356/3.09, 4.08, 356/141.4

(56) References Cited

U.S. PATENT DOCUMENTS

| | | | |
|---|---|---|---|
| 4,023,908 | * | 5/1977 | Johnson et al. . |
| 4,029,415 | * | 6/1977 | Johnson . |
| 4,030,832 | * | 6/1977 | Rando et al. . |
| 4,674,870 | * | 6/1987 | Cain et al. . |
| 4,676,634 | * | 6/1987 | Petersen . |
| 4,756,617 | | 7/1988 | Cain et al. . |
| 4,895,440 | * | 1/1990 | Cain et al. . |
| 4,936,678 | * | 6/1990 | Gordon et al. ........................ 356/375 |
| 5,894,344 | * | 4/1999 | Tamez et al. ........................ 356/4.08 |

FOREIGN PATENT DOCUMENTS

401259214 * 10/1989 (JP) ..................................... 356/3.09

* cited by examiner

Primary Examiner—Stephen C. Buczinski
(74) Attorney, Agent, or Firm—Jacobson, Price, Holman & Stern, PLLC (57) ABSTRACT

Conventional reference beam detecting apparatus require the use of transits and levels in addition to the reference beam detecting apparatus itself to make the operation of determining the height of construction very cumbersome. A reference beam detecting apparatus 404 according to the invention comprises a first light receiving section 412 and a second light receiving section 414. The angle SFH formed by the first light receiving section 412 and the front surface of the apparatus main body and the angle SFG formed by the second light receiving section 414 and the front surface of the apparatus main body are same and equal to about 30°. The reference beam detecting apparatus further comprises a light receiving position display section 118, a notch 140 and a data display section 404. An angular displacement computing circuit determines the angular displacement of the reference beam detecting apparatus 404 on the basis of the output signal of a laser beam detecting circuit to correct the error due to the angular displacement of the reference beam detecting apparatus.

10 Claims, 9 Drawing Sheets

REFERENCE IRRADIATION BEAM DETECTING APPARATUS

BACKGROUND OF THE INVENTION

1. Field of the Invention

This invention relates a reference beam detecting apparatus for detecting a reference laser beam emitted from a laser unit to determine the height of construction. It also relates to a reference beam detecting apparatus comprising a data display section for displaying its angular displacement relative to a laser unit and a data display section for displaying the distance between itself and the laser unit.

2. Prior Art

Transits and levels are conventionally used on building sites and other construction sites to determine a reference plane or a reference height. Recently, laser levels designed to emit laser beams in the form of a sector to define a reference plane are getting popular along with rotary laser units designed to emit a rotating laser beam to define a reference plane. Such a laser unit is typically used in combination with a reference beam detecting apparatus for receiving the emitted laser beam to define a reference plane or a reference height. The construction personnel puts a mark at each appropriate reference position to reflect the indication displayed on the display section of the reference beam detecting apparatus for that position.

Thus, known reference beam detecting apparatus are replacing transits, levels and other surveying apparatus to determine or select a reference height. However, actual construction works, if simple, involve a number of different surveying operations including determining the distance of a spot from a reference position, seeing the angle of a bent wall, finding the gradient of a ditch or a drain pipe and so on, that require the use of transits and levels in addition to the reference beam detecting apparatus to make such operations more cumbersome than before.

In view of the above identified problem of known reference beam detecting apparatus, it is therefore an object of the present invention to provide an improved reference beam detecting apparatus that can carry out various surveying operations including determining the distance of a pot from a reference position, seeing the angle of a bent wall and so on to significantly reduce the time required for a construction work.

Another object of the invention is to provide a reference beam detecting apparatus that can determine the gradation of a ditch, a drain pipe or some other object of construction.

SUMMARY OF THE INVENTION

According to a first aspect of the invention, the above objects and other objects are achieved by providing a reference beam detecting apparatus comprising a first light receiving section for receiving the laser beam emitted from a laser unit adapted to emit a laser beam onto a reference plane, a second light receiving section adapted to receive the laser beam with an angle of incidence different from that of the first light receiving section, an angular displacement computing circuit for determining by computation the angular displacement relative to the laser unit on the basis of the output signals from the first and second light receiving sections, a distance computing circuit for determining by computation the distance between the apparatus and the laser unit on the basis of the output signals of the first and second light receiving sections and the output signal of the angular displacement computing circuit and a light receiving position display section for displaying the position of receiving the incident laser beam on the basis of the output signals of the first and second light receiving sections.

With a reference beam detecting apparatus according to the invention and having a configuration as described above, the distance between the apparatus and a reference position or the angle of a bent wall can be detected effectively and efficiently to improve the efficiency of the current construction work.

According to a second aspect of the invention, there is also provided a reference beam detecting apparatus comprising a reference beam detecting apparatus comprising a first light receiving section for receiving the laser beam emitted from a laser unit adapted to emit a laser beam onto a reference plane, a second light receiving section adapted to receive the laser beam with an angle of incidence different from that of the first light receiving section, an angular displacement computing circuit for determining by computation the angular displacement of the apparatus relative to the laser unit on the basis of the output signals from the first and second light receiving sections, a distance computing circuit for determining by computation the distance between the apparatus and the laser unit on the basis of the output signals of the first and second light receiving sections and the output signal of the angular displacement computing circuit and a display section for displaying the outcome of the incidence of the laser beam on the basis of the output signals of the first and second light receiving sections.

With a reference beam detecting apparatus according to the invention and having a configuration as described above, the position of the apparatus can be aligned with the incident laser beam and hence the error of measurement that arises when the reference beam detecting apparatus is angularly displaced relative to the laser beam can be accurately corrected.

Preferably, a reference beam detecting apparatus according to the invention further comprises a data display section for displaying the angular displacement of the apparatus relative to the laser unit on the basis of the output signal of the angular displacement computing circuit.

Preferably, a reference beam detecting apparatus according to the invention further comprises a data display section for displaying the distance between the apparatus and the laser unit on the basis of the output signal of the distance computing circuit.

With such an arrangement, the angular displacement of the apparatus relative to the laser unit and the distance between the apparatus and the laser unit can be displayed in a simple manner to the operator of the reference beam detecting apparatus.

Still preferably, a reference beam detecting apparatus according to the invention further comprises a selected value of inclination input means for inputting a value of inclination to be use for the construction work into the laser unit, a height computing circuit for determining by computation the height to be used for the construction work on the basis of the selected value of inclination input by the selected value of inclination input means and the output signal of the distance computing circuit and a data display section for displaying the height to be used for the construction work on the basis of the output signal of the height computing circuit.

With such an arrangement, a value of inclination to be used for the construction work can be selected with ease.

Still preferably, a reference beam detecting apparatus according to the invention further comprises an external output means for externally output at least part of the data displayed on the data display section.

With such an arrangement, the data displayed on the data display section can be processed and displayed with ease by means of a display apparatus or a data processing apparatus external to the reference beam detecting apparatus.

DESCRIPTION OF THE PREFERRED EMBODIMENTS

Now, the present invention will be described by referring to the accompanying drawings that illustrate preferred embodiments of the invention.

Figure 2:
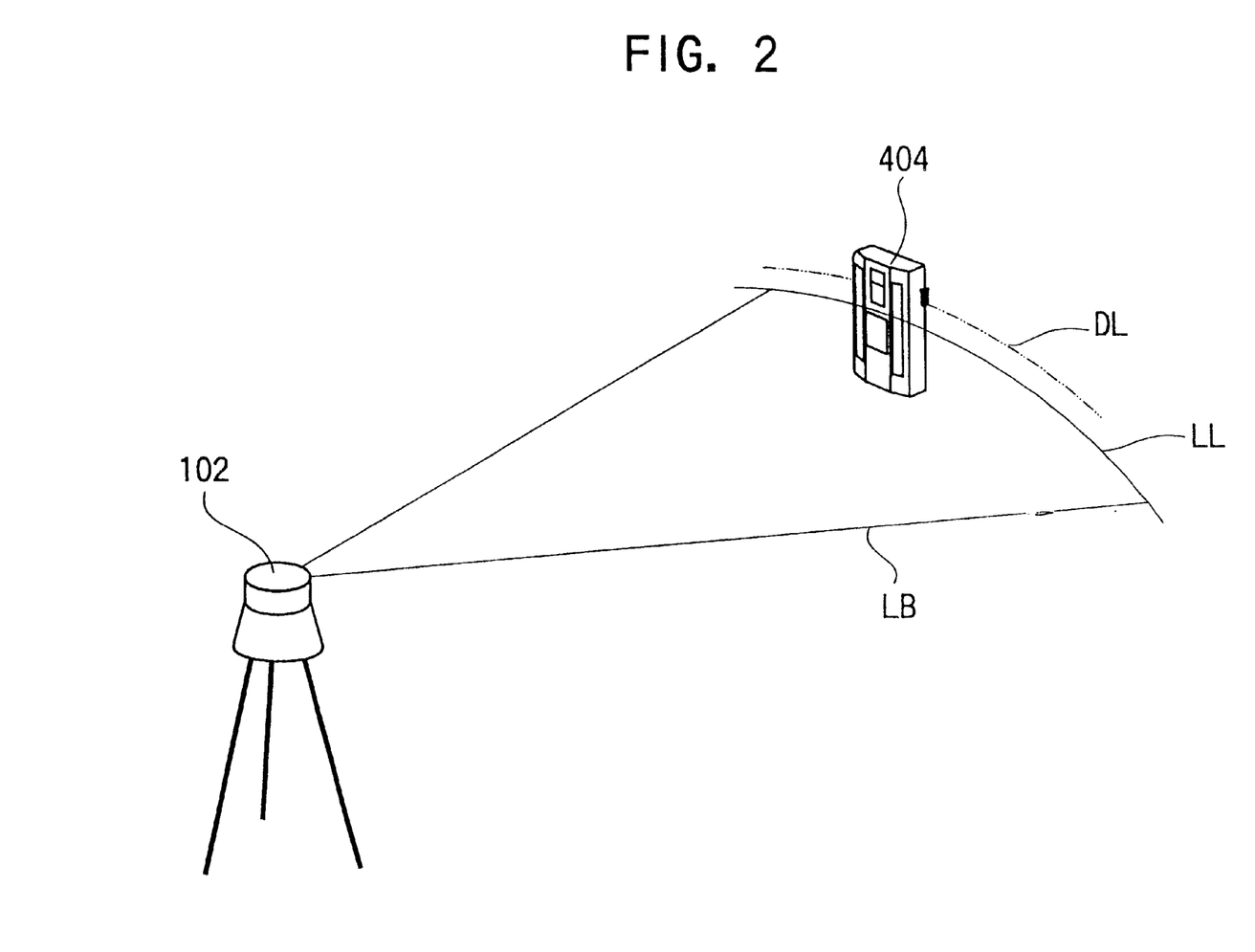
FIG. 2 is a schematic illustration of the underlying principle of operation of a reference beam detecting apparatus according to the invention.

FIG. 2 schematically illustrates the underlying principle of operation of a reference beam detecting apparatus according to the invention. Referring to FIG. 2, laser unit 102 emitting a horizontal laser beam Lb is rotated around its vertical axis to define a reference plane. The reference beam detecting apparatus 404 is arranged, for example, on a wall (not shown) located within the shooting range of the laser beam LB. Reference symbol LL denotes the beam track of the laser beam LB on the wall and reference symbol DN denotes a reference line displaced from the beam track LL by a predetermined distance.

Figure 1:
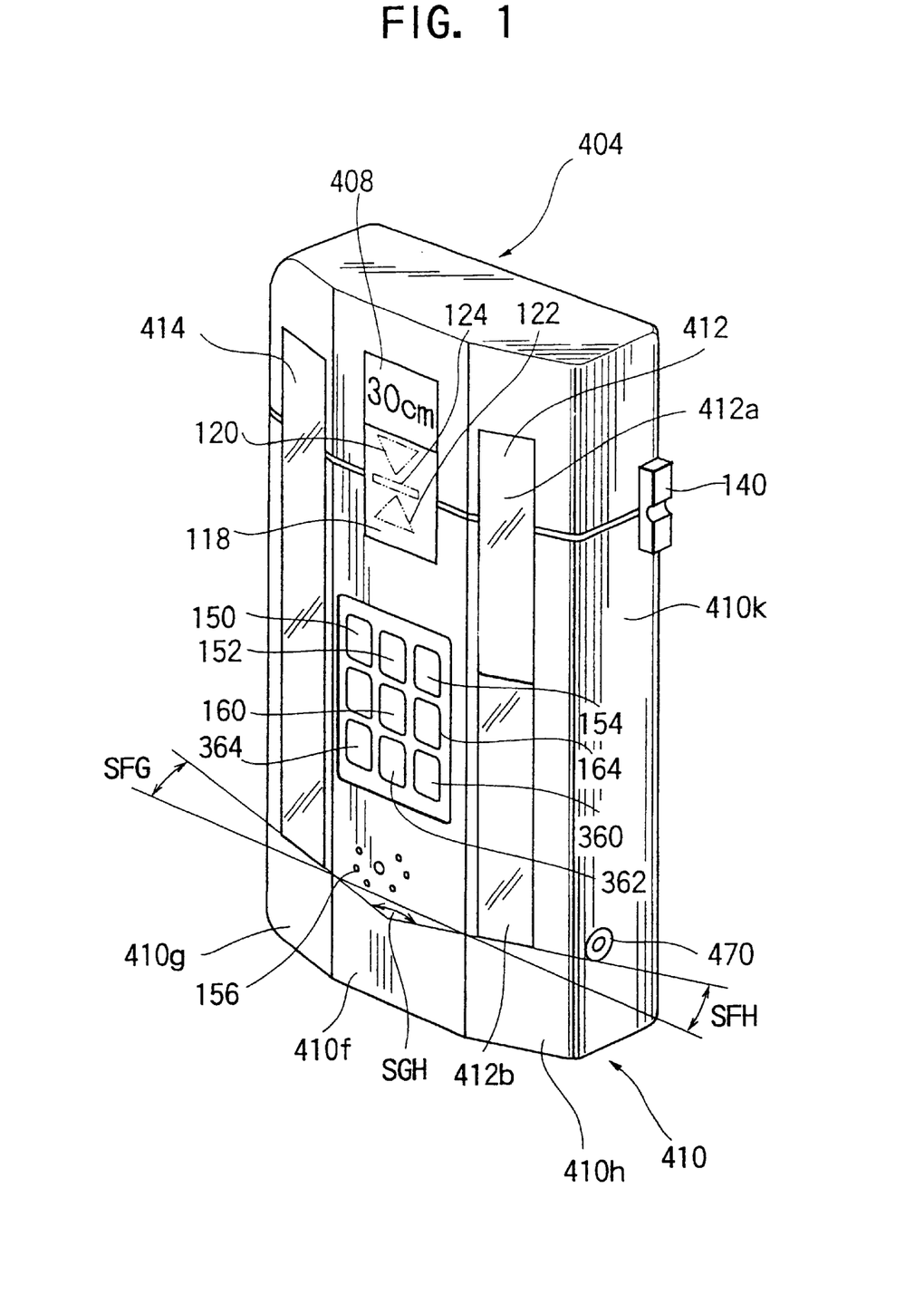
FIG. 1 is a schematic perspective view of an embodiment of reference beam detecting apparatus according to the invention.

Referring now to FIG. 1, the reference beam detecting apparatus 404 comprises a main body 410, which has a front surface 410f, a left deflected surface 410g, a right deflected surface 410h and a left lateral surface 410k. The left deflected surface 410g shows an angle of about 30° relative to the front surface 410f. The right deflected surface 410h also shows an angle of about 30° relative to the front surface 410f. Thus, the left deflected surface 410g and the right deflected surface 410h shows an angle of about 120° relative to each other.

Thus, with the embodiment of FIG. 2, the main body 410 has a thickness that is greatest at the front surface 410f and decreased gradually toward the lateral surfaces. The main body 410 shows a hexagonal plan view.

The reference beam detecting apparatus 404 also comprises a first light receiving section 412 arranged on the right deflected surface 410h and adapted to detect a laser beam LB striking it in the direction perpendicular to the surface 410h and a second light receiving section 414 arranged on the left deflected surface 410g and adapted to detect a laser beam LB striking it in the direction perpendicular to the surface 410g. The longitudinal axial line of the first light receiving section 412 and that of the second light receiving section 414 are parallel to each other. When projected onto a plane including the front surface 410f, both the first light receiving section 412 and the second light receiving section 414 show an identical width.

The angle SFH formed by the first light receiving section 412 and the front surface 410f is between about 10° and about 40° preferably between about 25° and 35°, most preferably about 30°. Similarly, the angle SFG formed by the second light receiving section 414 and the front surface 410f is between about 10° and about 40°, preferably between about 25° and 35°, most preferably about 30°.

Thus, the first light receiving section 412 and the second light receiving section 414 most preferably shows an angle SGH of about 120°. Additionally, the surface of the first light receiving section 412 is arranged preferably in parallel with the right deflected surface 410h and that of the second light receiving section 414 is arranged preferably in parallel with the left deflected surface 410g.

The reference beam detecting apparatus 404 further comprises a light receiving position display section 118 for displaying the shifted position, if any, of the detected laser beam LB relative to a reference position arranged on the front surface 410f, a notch 140 arranged on the right lateral surface 410k at a position corresponding to the light receiving position display section 140 and a data display section 408 for displaying data such as a gradient, the angular displacement obtained by computation, a distance or a height of construction.

The light receiving position display section 118 and the data display section 408 comprises respective liquid crystal panels. Alternatively, the light receiving position display section 118 and the data display section 408 may comprise respective LEDs. The light receiving position display section 118 and the data display section 408 may be integral with each other or separate from each other.

The first light receiving section 412 and the second light receiving section 414 comprise respective position sensors such as CCDs or PSDs. At least the first light receiving section 412 divided into upper and lower light receiving portions 412a, 412b. The reference beam detecting apparatus 404 shows a reference position when the laser beam LB emitted from the rotary laser unit scans the center line of the first light receiving section 412 separating the upper and lower light receiving portions 412a, 412b thereof and then the reference position indicator 124 of the light receiving position display section 118 is highlighted.

When the laser beam LB scans the upper light receiving portion 412a of the first light receiving section 412, the upward indicator 122 of the light receiving position display section 118 is highlighted to prompt an upward movement of the main body 410 for getting to the reference position. Similarly, when the laser beam LB scans the lower light receiving portion 412b of the first light receiving section 412, the downward indicator 120 of the light receiving position display section 118 is highlighted to prompt a downward movement of the main body 410 for getting to the reference position.

The reference position can be detected more accurately when the first light receiving section 412 and the second light receiving section 414 are made to comprise respective position sensors such as CCDs or light receiving devices having a specific profile. If such is the case, the scanning position of the laser beam LB relative to the reference position can be determined by selecting a specific position in the first light receiving section 412 and the second light receiving section 414 as reference position.

The reference beam detecting apparatus 404 further comprises a power switch 150, a detection accuracy regulating button 152, an alarm buzzer on/off button 154, an alarm buzzer 156, a display mode selection switch 160 and mode selection switches 360, 362 and 364. A display mode and a data input mode may be selected by means of the mode selection switches 360, 362 and 364. For example, the mode selection switch 360 may be used to input a gradient.

For example, if a gradient of "+3%" is input to the reference beam detecting apparatus 404, it will have to be located at a position higher than the laser unit 102 by 15 centimeters if it is horizontally separated from the latter by 5 meters. Similarly, it will have to be located at a position higher than the laser unit 102 by 30 centimeters if it is horizontally separated from the latter by 10 meters. In short, the vertical height of the reference beam detecting apparatus 404 from the laser beam LB emitted horizontally from the laser unit 102 changes proportionally relative to the horizontal distance between the reference beam detecting apparatus 404 and the laser unit 102.

The reference beam detecting apparatus 404 detects the distance between itself and the laser unit 102 and performs a computing operation by using the gradient value input in advance. The outcome of the computing operation is displayed on the data display section 408 of the reference beam detecting apparatus 404. Thus, regardless of the distance between the reference beam detecting apparatus 404 and the laser unit 102, a construction work involving a predetermined gradient can be carried out by using the height of construction displayed on the reference beam detecting apparatus 404.

Figure 3:
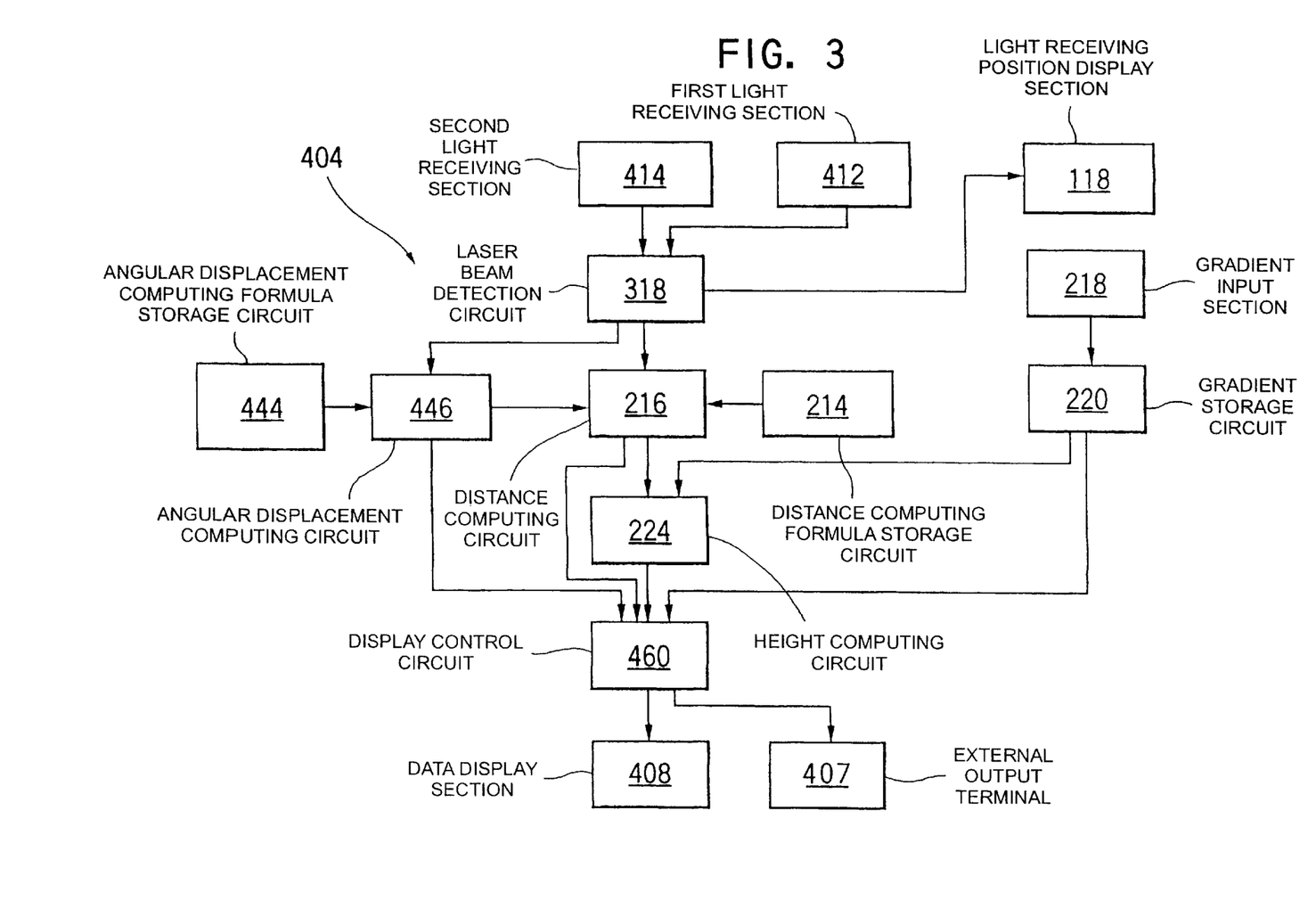
FIG. 3 is a schematic block diagram of the embodiment of reference beam detecting apparatus according to the invention.

Now, referring to FIG. 3, it will be seen that the reference beam detecting apparatus 404 comprises a laser beam detection circuit 318 for detecting the laser beam LB received by the first light receiving section 412 and the second light receiving section 414 and a light receiving position display section 118 for displaying the outcome of the operation of detecting the laser beam LB on the basis of the output signal from the laser beam detection circuit 318.

As described above, the reference position indicator 124, the upward indicator 122 or the downward indicator 120 is highlighted in the light receiving position display section 118 depending on the position of receiving the laser beam LB.

The reference beam detecting apparatus 404 further comprises a distance computing formula storage circuit 214 storing the formulas for determining by computation the distance LRS from the laser unit 102 to the reference beam detecting apparatus 404, an angular displacement computing formula storage circuit 444 storing the formulas for determining by computation the angular displacement SY of the reference beam detecting apparatus 404 relative to a vertical plane including the laser unit 102, an angular displacement computing circuit 446 for determining by computation the angular displacement of the reference beam detecting apparatus 404 by means of the formulas for determining the angular displacement stored in the angular displacement computing formula storage circuit 444 on the basis of the output signal of the laser beam detection circuit 318, a distance computing circuit 216 for receiving the output of the angular displacement computing circuit 446 and determining by computation the distance from the laser unit 102 to the reference beam detecting apparatus 404 by means of the formulas stored in the formulas for determining the distance LRS on the basis of the output signal of the angular displacement computing circuit 446. The signal relating to the angular displacement of the reference beam detecting apparatus 404 and the signal relating the distance from the laser unit 102 to the reference beam detecting apparatus 404 are then input to the display control circuit 460. The display control circuit 460 outputs a display control signal to the data display section 408 on the basis of the input data and the angular displacement of the reference beam detecting apparatus 404 and the distance from the laser unit 102 to the reference beam detecting apparatus 404 are displayed on the data display section 408.

The reference beam detecting apparatus 404 further comprises a gradient input section 218 for receiving gradient data necessary for the current construction work, a gradient storage circuit 220 for storing the input gradient data according to the output signal of the gradient input section 218 and a height computing circuit 224 for computing the height of construction according to the output signal of the distance computing circuit 216 and the gradient data stored in the gradient storage circuit 220. The signal relating to the height of construction computed by the height computing circuit 224 and the signal relating to the gradient data stored in the gradient storage circuit 220 are input to the display control circuit 460. The display control circuit 460 outputs a display control signal to the data display section 408 on the basis of the input data and the gradient data and the height of construction are displayed on the data display section 408.

The reference beam detecting apparatus 404 further comprises an external output terminal 407 for outputting the output signal of the display control circuit 460 to external equipment (not shown).

Figure 4:
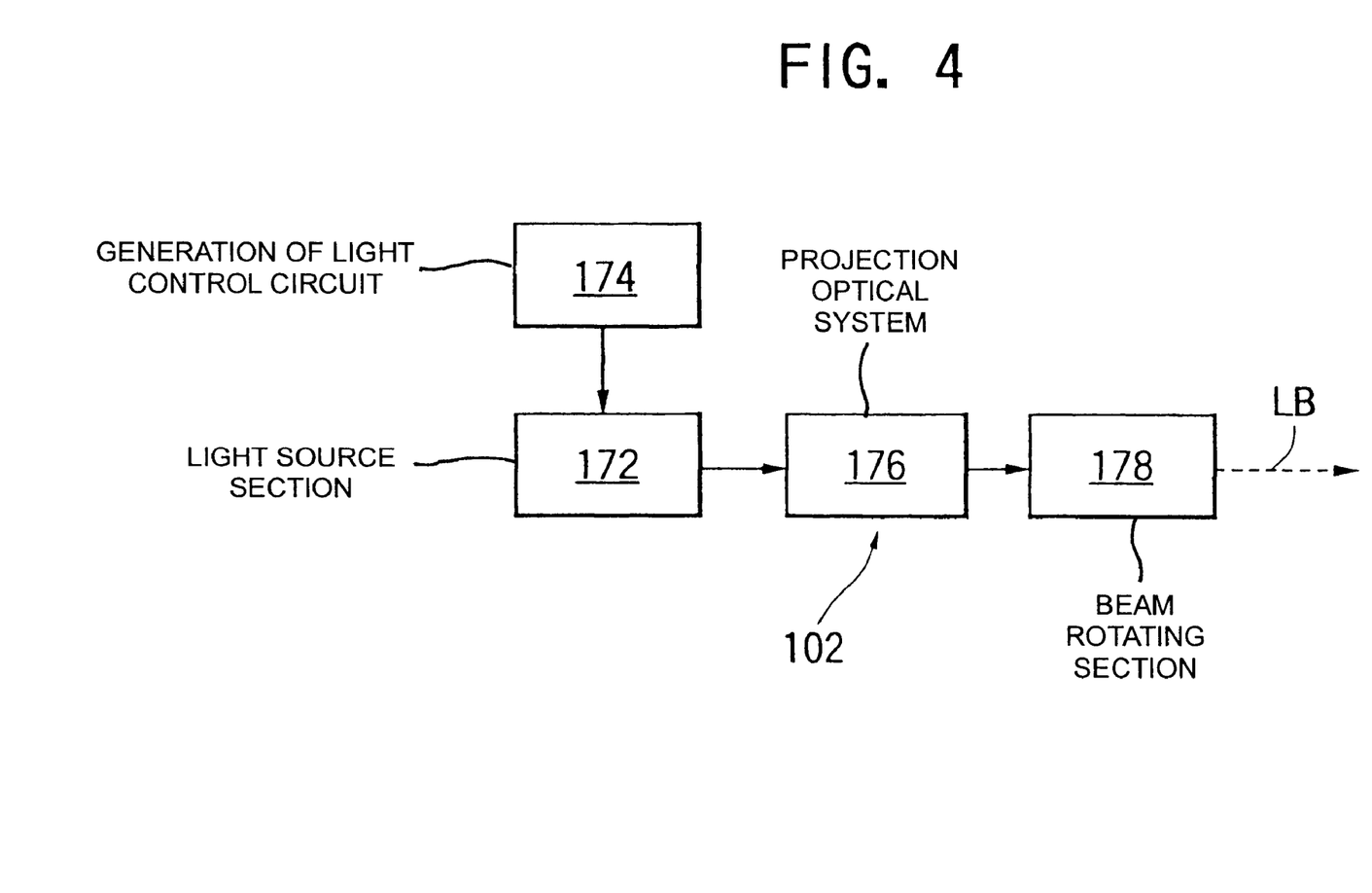
FIG. 4 is a schematic block diagram of a laser unit to be used to emit a laser beam to a reference beam detecting apparatus according to the invention.

Referring now to FIG. 4, the laser unit 102 comprises a light source section 172 for generating a laser beam, a generation of light control circuit 174 for controlling the operation of light source section 172, a projection optical system 176 for emitting a laser beam as a collimated beam and a beam rotating section 178 for rotating the laser beam on a reference plane. The laser beam generated by the light source section 172 passes through the projection optical system 176 and rotated by the beam rotating section 178 before emitted toward the two light receiving sections 412 and 414 of the reference beam detecting apparatus 404 as laser beam LB that rotates at a constant rate of rotation.

The laser beam LB emitted from the laser unit 102 is rotated at a constant rate of rotation and maintains a constant beam diameter, although the beam may be made to show a given angle of divergence. The light receiving sections 412 and 414 have a given effective width in the direction of rotation of the laser beam LB.

When the reference beam detecting apparatus 404 is arranged with angular displacement SY=0° or when the front surface 410*f* of the reference beam detecting apparatus 404 is positioned perpendicular relative to the direction along which the laser beam LB is emitted, the distance LRS from the laser unit 102 to the reference beam detecting apparatus 404 is determined in a manner as described below.

Figure 5A:
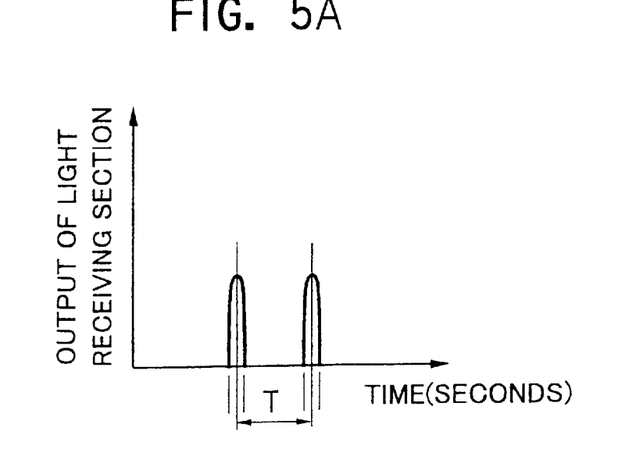
FIGS. 5(a) and 5(b), collectively referred to as FIG. 5, show a schematic plan view of a laser beam passing through the light receiving sections of a reference beam detecting apparatus according to the invention (FIG. 5(a)) and a graph showing the output signal of the light receiving section under this condition (FIG. 5(b)).

Referring to FIG. 5, the first light receiving section 412 shows an angle SR relative to plane LBZ that is perpendicular to the laser beam LB. Under the condition of FIG. 5, SR is SR1=30° as viewed counterclockwise.

On the other hand, the second light receiving section 414 shows an angle SL relative to plane LBZ that is perpendicular to the laser beam LB. Under the condition of FIG. 5, SL is SL1=30° as viewed clockwise.

Figure 5B:
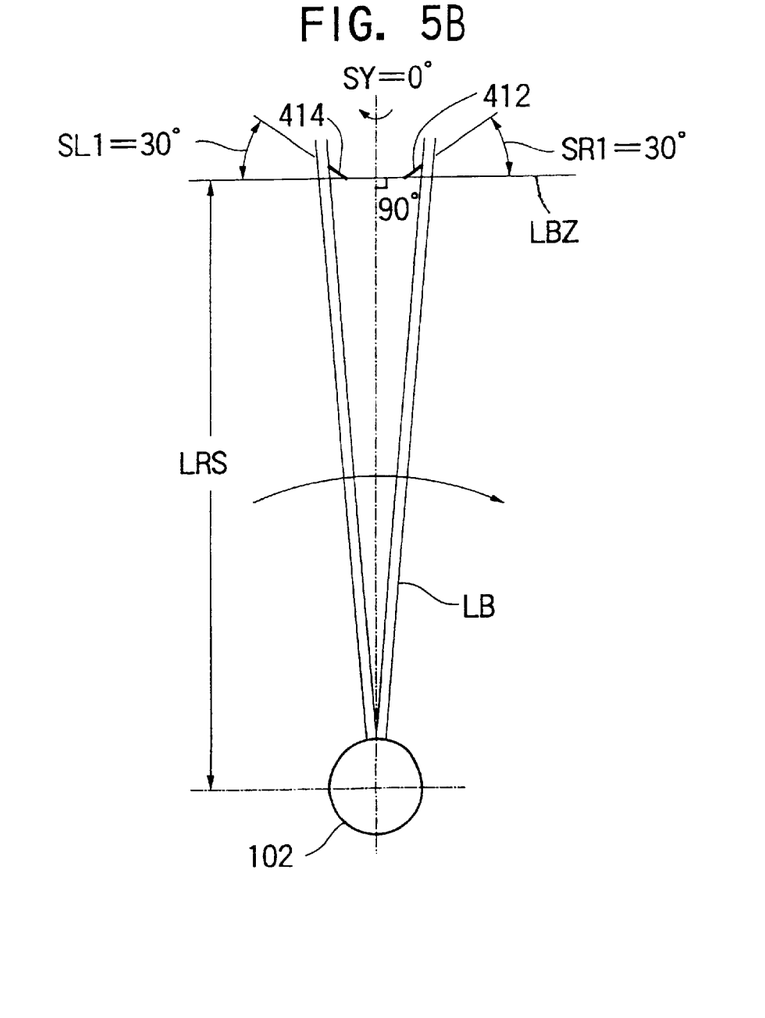

The first light receiving section 412 and the second light receiving section 414 of the reference beam detecting apparatus 404 detect the laser beam LB emitted from and rotated by the laser unit 102 and determine by computation the distance LRS from the laser unit 102 to the reference beam detecting apparatus 404 from the rate of rotation of the laser beam LB, the beam diameter of the laser beam LB, the distance LELE between the first light receiving section 412 and the second light receiving section 414 and the time T taken by the laser beam LB to transverse the first light receiving section 412 and the second light receiving section 414 (see FIG. 5(*b*)).

The temporal gap between the time when the laser beam LB is received by the first light receiving section 412 and the time when it is received by the second light receiving section 414 will be measured in a manner as described below. This temporal gap is measured by the laser beam detection circuit 318.

Figure 6:
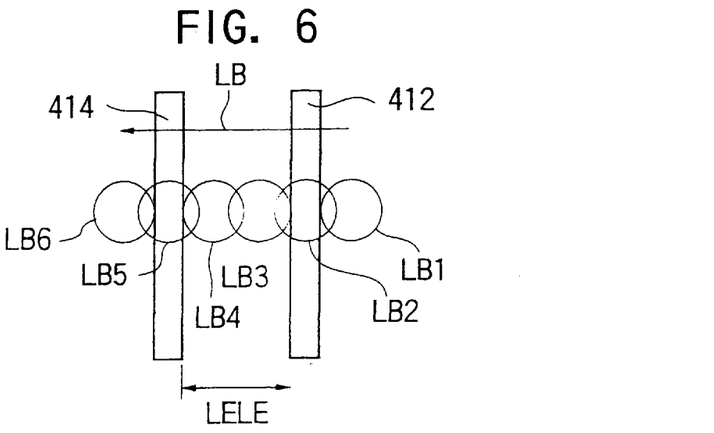
FIG. 6 is a schematic front view of a laser beam passing through the light receiving sections of a reference beam detecting apparatus according to the invention.

Referring to FIG. 6, the laser beam LB that crosses the first light receiving section 412 along the arrow starts entering the first light receiving section 412 as LB1 and hits the horizontal center of the first light receiving section 412 as LB2 before it leaves the first light receiving section 412 as LB3. Then, the laser beam LB that crosses the second light receiving section 414 along the arrow starts entering the second light receiving section 414 as LB4 and hits the horizontal center of the second light receiving section 414 as LB5 before it leaves the second light receiving section 414 as LB6.

Figure 7:
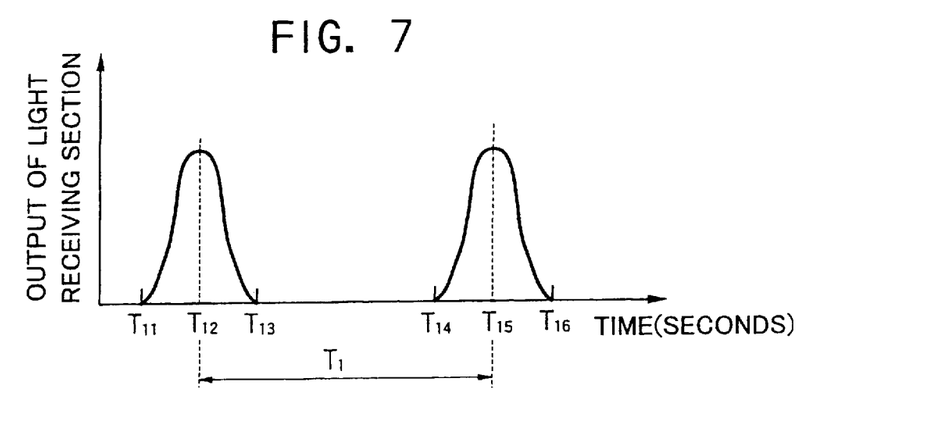
FIG. 7 is a graph showing an output signal of the light receiving sections of a reference beam detecting apparatus according to the invention.

Referring now to FIG. 7, the output signal of the first light receiving section 412 that receives the laser beam LB starts appearing at time T11 and gets to a maximum level at time T12 before it disappears at time T13. Then, output signal of the second light receiving section 414 that receives the laser beam LB starts appearing at time T14 and gets to a maximum level at time T15 before it disappears at time T16. The laser beam detection circuit 318 measures the temporal gap T1 between time T12 and time T15.

Figure 8:
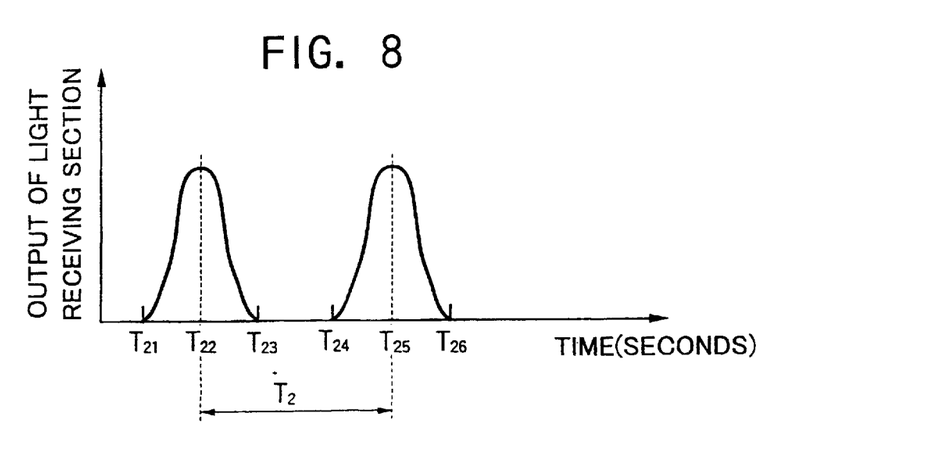
FIG. 8 is a graph showing an output signal of the light receiving sections of a reference beam detecting apparatus according to the invention.

Referring to FIG. 8, as in the case of FIG. 7, the output signal of the first light receiving section 412 that receives the laser beam LB starts appearing at time T21 and gets to a maximum level at time T22 before it disappears at time T23. Then, output signal of the second light receiving section 414 that receives the laser beam LB starts appearing at time T24 and gets to a maximum level at time T25 before it disappears at time T26. The laser beam detection circuit 318 measures the temporal gap T2 between time T22 and time T25.

Note that T1 of FIG. 7 is greater than T2 of FIG. 8 to indicate that the distance between the laser unit 102 and the reference beam detecting apparatus 404 is shorter in FIG. 7 than in FIG. 8. In other words, the shorter the distance LRS between the laser unit 102 and the reference beam detecting apparatus 404, the greater the temporal gap between the time when the output signal of the first light receiving section 412 gets to a maximum level and the time when the output signal of the second light receiving section 414 gets to a maximum level.

The laser beam detection circuit 318 measures the temporal gap T1 between time T12 and time T15 by means of a counter.

In the next stage of operation, the count of the counter is read out and used to determine the distance LRS between the laser unit 102 and the reference beam detecting apparatus 404 and then a gradient will be selected.

Now, how a gradient is selected for the purpose of the invention will be described below.

Assume that the laser beam LB has a diameter of d[mm] and each of the first light receiving section 412 and the second light receiving section 414 has a width of w[mm].

Then, the effective width WF of the first light receiving section 412 relative to a plane perpendicular to the laser beam LB is expressed by equation $$WF = w \cdot \cos SR$$

and the effective width WS of the seecond light receiving section 414 relative to a plane perpendicular to the laser beam LB is expressed by equation $$WS = w \cdot \cos SL.$$

For the above described embodiment of reference beam detecting apparatus 404, $$WF = WS$$

Assume further that the distance between the first light receiving section 412 and the second light receiving section 414 is LELE[mm] and the number of rotations per minute of the laser beam LB emitted from the laser unit 102 is RLB[rpm], whereas the distance between the laser unit 102 and the reference beam detecting apparatus 404 is LRS.

The time Sd[sec] required for the laser beam LB to get to the center of the second light receiving section 414 from the center of the first light receiving section 412 is determined by formula 1 below.

$$Sd = (LELE + WF/2 + WS/2)/(2\pi \times LRS \times RLB/60) \quad (1)$$
$$= (LELE + WF)/(2\pi \times RLB \times Sd/60)$$

Therefore, the distance LRS is expressed by formula 2 below.

$$LRS = (LELE + WF)/(2\pi \times RLB \times Sd/60) \quad (2)$$

Referring back to FIG. 3, the distance computing formula storage circuit 214 stores this formula (formula 2).

Note that the diameter d[mm] of the laser beam LB, the width w[mm] of each of the first and second light receiving sections 412, 414, the angle SR of the first light receiving section 412 relative to a plane perpendicular to the laser beam LB, the angle SR of the second light receiving section 414 relative to a plane perpendicular to the laser beam LB and the number of rotations per minute RLB[rpm] of the laser beam LB emitted from the laser unit 102 may be stored in the distance computing formula storage circuit 214 of the reference beam detecting apparatus 404. Alternatively, the operator of the reference beam detecting apparatus 404 may input these values, which are then stored by the distance computing formula storage circuit 214.

Upon receiving the output signal of the laser beam detection circuit 318, the distance computing circuit 216 determines by computation the distance LRS between the laser unit 102 and the reference beam detecting apparatus 404, using the distance computing formula (formula 2) stored in the distance computing formula storage circuit 214.

The height computing circuit 224 determines by computation the height HIG of construction from formula (formula 3) shown below, using the gradient SLA stored in the gradient storage circuit 220 and the distance LRS output from the distance computing circuit 216.

If the gradient of construction is SLA[%], the height HIG[mm] of construction is expressed by formula below.

$$HIG=SLA \times LRS/100 \qquad (3)$$

If the reference beam detecting apparatus 404 is arranged with an angular displacement of SY relative to the laser unit 102 or if the front surface 410 of the reference beam detecting apparatus 404 is angularly displaced clockwise by angle SY when viewed from above, the distance LRS between the laser unit 102 and the reference beam detecting apparatus 404 is determined in a manner as described below.

Figure 9A:
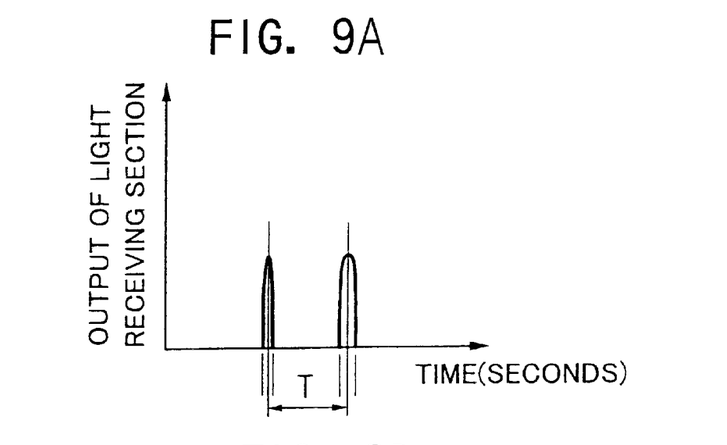
FIGS. 9(a) and 9(b), collectively referred to as FIG. 9, show a schematic plan view of a laser beam passing through the light receiving sections of a reference beam detecting apparatus according to the invention (FIG. 5(a)) and a graph showing the output signal of the light receiving section under this condition (FIG. 5 (b)) when the reference beam detecting apparatus is angularly displaced relative to the laser unit.
Figure 9B:
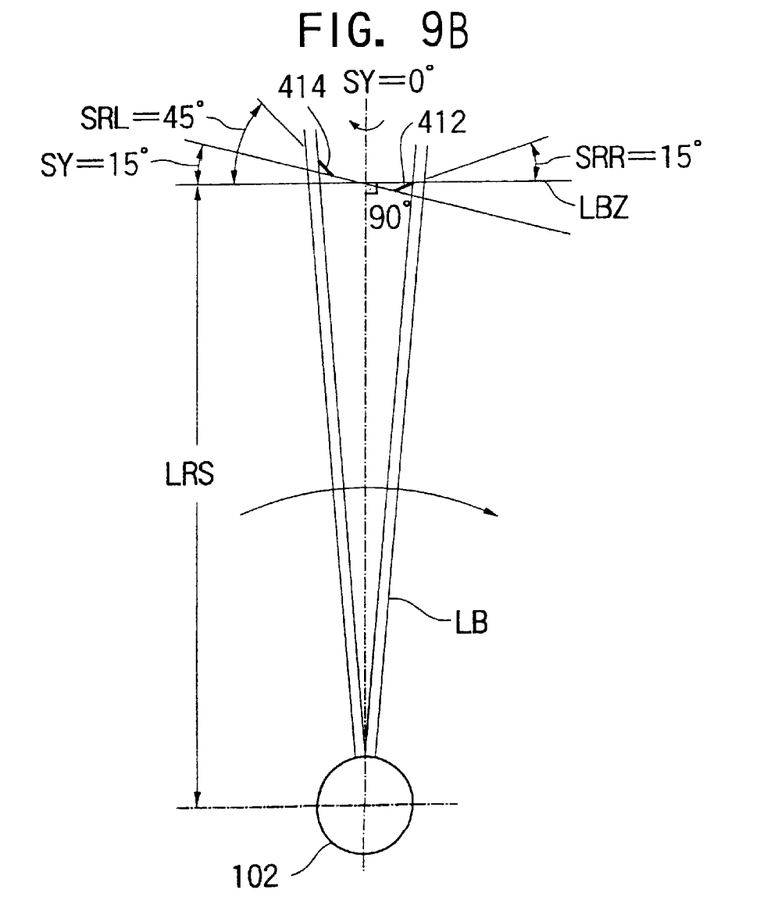

Referring to FIG. 9, the first light receiving section 412 and the second light receiving section 414 of the reference beam detecting apparatus 404 detect the laser beam LB emitted from and rotated by the laser unit 102 and determine by computation the distance LRS from the laser unnit 102 to the reference beam detecting apparatus 404 from the rate of rotation of the laser beam LB, the beam diameter of the laser beam LB, the distance LELE between the first light receiving section 412 and the second light receiving section 414 and the time T taken by the laser beam LB to transverse the first light receiving section 412 and the second light receiving section 414 (see FIG. 9(*b*)).

Since the reference beam detecting apparatus 404 has been turned by an angular displacement SY relative to a plane LBZ perpendicular to the direction along which laser beam LB is emitted so that, if the distance LELE between the first light receiving section 412 and the second light receiving section 414 is used for determining the distance LRS, the error contained in the distance LELE due to the angular displacement SY should be corrected.

FIG. 9 shows that the angular displacement SY is equal to 15° (see FIG. 9(*a*)). Therefore, the first light receiving section 412 shows an angle of 15° relative to the plane LBZ while the second light receiving section 414 shows an angle of 45° relative to the plane LBZ.

The temporal gap between the time when the laser beam LB is received by the first light receiving section 412 and the time when it is received by the second light receiving section 414 will be measured in a manner as described below.

In this case again, the laser beam LB emitted from the laser unit 102 is rotated at a constant rate of rotation and maintains a constant beam diameter, although the beam may be made to show a given angle of divergence. The light receiving sections 412 and 414 have a given effective width in the direction of rotation of the laser beam LB.

Figure 10:
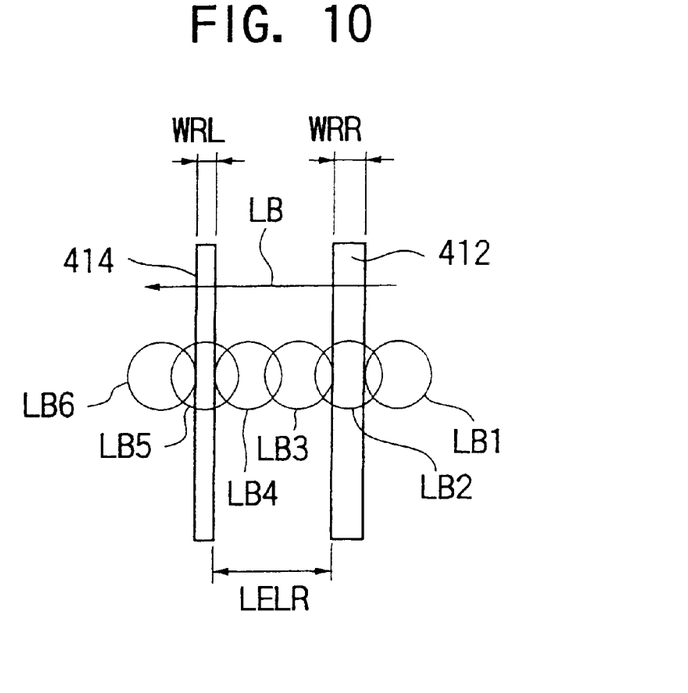
FIG. 10 is a schematic front view of a laser beam passing through the light receiving sections of a reference beam detecting apparatus according to the invention when the reference beam detecting apparatus is angularly displaced relative to the laser beam.

Referring to FIG. 10, the laser beam LB that crosses the first light receiving section 412 along the arrow starts entering the first light receiving section 412 as LB1 and hits the horizontal center of the first light receiving section 412 as LB2 before it leaves the first light receiving section 412 as LB3. Then, the laser beam LB that crosses the second light receiving section 414 along the arrow starts entering the second light receiving section 414 as LB4 and hits the horizontal center of the second light receiving section 414 as LB5 before it leaves the second light receiving section 414 as LB6.

Figure 11:
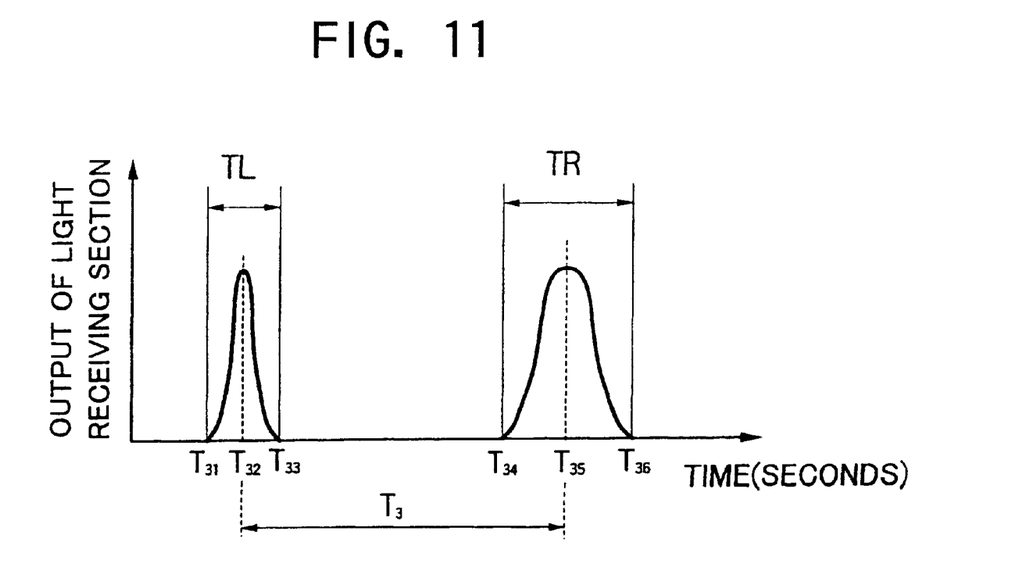
FIG. 11 is a graph showing an output signal of the light receiving sections of a reference beam detecting apparatus according to the invention when the reference beam detecting apparatus is angularly displaced relative to the laser beam.

Referring now to FIG. 11, the output signal of the first light receiving section 412 that receives the laser beam LB starts appearing at time T31 and gets to a maximum level at time T32 before it disappears at time T33. Then, output signal of the second light receiving section 414 that receives the laser beam LB starts appearing at time T34 and gets to a maximum level at time T35 before it disappears at time T36.

The laser beam detection circuit 318 measures the temporal gap T3 between time T32 and time T35. The laser beam detection circuit 318 measures the temporal gap TL between time T31 and time T33 and also the temporal gap TR between time T34 and time T36 by means of a counter.

Referring to FIG. 10, if the peripheral velocity of the laser beam LB at the position of the reference beam detecting apparatus 404 is VLB and the effective width of the first light receiving section 412 for receiving the laser beam LB is WRR while the effective width of the second light receiving section 414 for receiving the laser beam LB is WRL, The angular displacement SY is determined by eliminating VLB from the following two equations.

$$VLB \times TR = WRR \qquad (4)$$

$$VLB \times TL = WRL \qquad (5)$$

Formula (4) is transformed into the equation below.

$$VLB \times TR = w \times \cos(SR-SY) \qquad (6)$$

Similarly, formula (5) is transformed into the equation below.

$$VLB \times TR = w \times \cos(SL+SY) \qquad (7)$$

Thus, $$(\cos SR \times \cos SY + \sin SR \times \sin SY)/TR = (\cos SL \times \cos SY - \sin SL \times \sin SY)/TL$$

then $$(\sin SR/TR + \sin SL/TL) \times \sin SY = (\cos SL/TR - \cos SR/TR) \times \cos SY$$

then $$\sin SY/\cos SY = \tan SY = (\cos SL/TL - \cos SR/TR)/(\sin SR/TR + \sin SR/TL)$$

then $$SY = \arctan((\cos SL/TL - \cos SR/TR)/(\sin SR/TR + \sin SL/TL)) \qquad (8)$$

In formula (8), the values for SL and SR are given for the reference beam detecting apparatus 404 and stored in the angular displacement computing formula storage circuit 444.

The computational procedure using formulas (4) through (8) are stored also in the angular displacement computing formula storage circuit 444.

The values of TL and TR are determined from the outcome of counting operation of the counter. Thus, the angular displacement SY of the 404 can be determined by computation by means of the angular displacement computing circuit 446.

In this way, the angular displacement of the reference beam detecting apparatus 404 relative to the direction along which the laser beam LB is emitted is corrected. Then, the correct distance between the laser unit 102 and the reference beam detecting apparatus 404 is determined so that the height of construction will be accurately selected.

Thus, the corrected distance LELR between the first light receiving section 412 and the second light receiving section 414 is determined by the equation below.

$$LELR = LELE \times \cos SY \tag{9}$$

The effective width WG of the first light receiving section 412 relative to a plane perpendicular to the laser beam LB is determined by the equation below.

$$WG = w \cdot \cos(SR - SY) \tag{10}$$

Similarly, the effective width WT of the second light receiving section 414 relative to a plane perpendicular to the laser beam LB is determined by the equation below.

$$WT = w \cdot \cos(SR + SY) \tag{11}$$

The height of construction is then determined in the following manner.

Assume, as described earlier, that the laser beam LB has a diameter of d[mm] and each of the first and second light receiving sections 412 and 414 has a width of w[mm] and that the distance between the first light receiving section 412 and the second light receiving section 414 is LELE[mm] and the number of rotations per minute of the laser beam LB emitted from the laser unit 102 is RLB[rpm], whereas the distance between the laser unit 102 and the reference beam detecting apparatus 404 is LRS.

The time Sd[sec] required for the laser beam LB to get to the center of the second light receiving section 414 from the center of the first light receiving section 412 is determined by formula 1 below.

$$Sd = (LELR + WG/2 + WT/2)/(2\pi \times LRS \times RLB/60) \tag{12}$$

Therefore, $$LRS = (LELR + WG/2 + WT/2)/(2\pi \times RLB \times Sd/60) \tag{13}$$

In equation (11), the value of LELR has been determined by means of equation (9) above and those of WG and WT have been determined respectively by means of equations (10) and (11) as described above. RLB has a value given by the laser unit 102 and the value of Sd is detected by the embodiment of reference beam detecting apparatus 404 of this embodiment.

Thus, the distance LRS between the laser unit 102 and the reference beam detecting apparatus 404 can be determined by means of equation (13) above.

Referring back to FIG. 3, the distance computing formula storage circuit 214 stores the formula (formula 13) for determining the distance.

Note that the diameter d[mm] of the laser beam LB, the width w[mm] of each of the first and second light receiving sections 412, 414, the angle SR of the first light receiving section 412 relative to a plane perpendicular to the laser beam LB, the angle SR of the second light receiving section 414 relative to a plane perpendicular to the laser beam LB and the number of rotations per minute RLB[rpm] of the laser beam LB emitted from the laser unit 102 may be stored in the distance computing formula storage circuit 214 of the reference beam detecting apparatus 404. Alternatively, the operator of the reference beam detecting apparatus 404 may input these values, which are then stored by the distance computing formula storage circuit 214.

Upon receiving the output signal of the laser beam detection circuit 318, the distance computing circuit 216 determines by computation the distance LRS between the laser unit 102 and the reference beam detecting apparatus 404 on the basis of the output signal of the angular displacement computing circuit 446, using the distance computing formulas (formulas 4 through 13) stored in the distance computing formula storage circuit 214.

The height computing circuit 224 determines by computation the height HIG of construction from formula (formula 3) shown below, using the gradient SLA stored in the gradient storage circuit 220 and the distance LRS output from the distance computing circuit 216.

The data display section 408 receives the output signal of the height computing circuit 224 and displays the outcome of the computing operation for the height of construction.

Now, a specific example of configuration of a reference beam detecting apparatus according to the invention and its operation will be described below.

Figure 12:
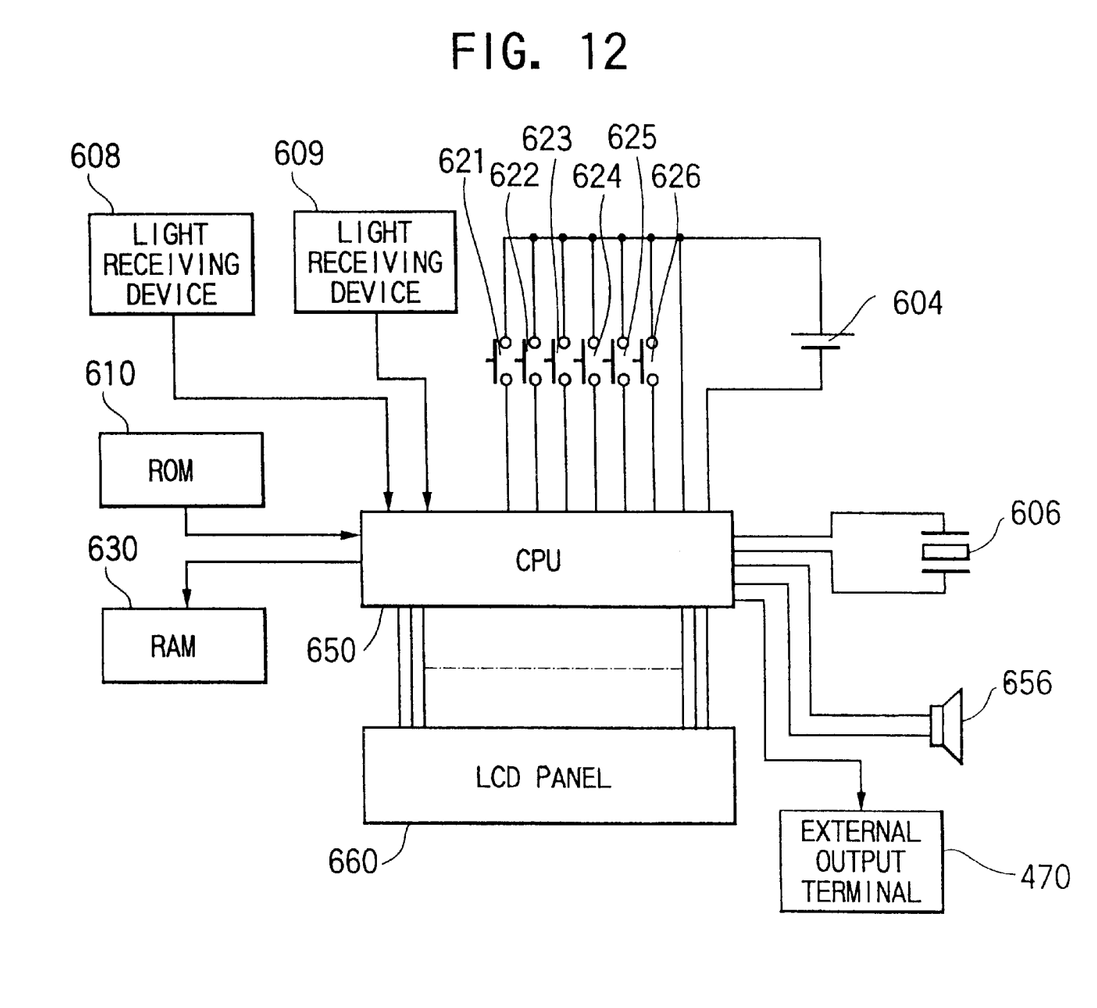
FIG. 12 is a schematic block diagram of another embodiment of reference beam detecting apparatus according to the invention.

Referring to FIG. 12, a reference beam detecting apparatus according to the invention comprises a power source 604 may be a battery, an oscillation source 606 such as a crystal oscillator, a pair of light receiving devices 608 and 609 for receiving a laser beam, a ROM 610 storing processing program, formulas for determining by a distance by computation, formulas for determining an angle or rotation by computation, one or more than one switches 621 through 626 for inputting necessary data, a RAM 630 for storing the data input through the switches, a CPU for driving the processing program stored in the ROM 610 and processing numerical data, computational operations and comparing operations, using data stored in the ROM 610 and/or the RAM 630, an alarm buzzer 656 for sounding an alarm sound, an LCD panel 660 for displaying the input data and the outcome of computational operations and an external output terminal (external output means) for externally output the data to be displayed.

The reference beam detecting apparatus is activated when the switch 621 is turned on. Then, as the light receiving devices 608 and 608 receive a laser beam, the CPU 650 determines by computation the distance between the laser unit and the reference beam detecting apparatus, using the computational formulas for determining the distance and those for determining the angular displacement stored in the ROM 610 and the gradient data stored in the RAM 630 and correcting the angular displacement, if the reference beam detecting apparatus has been angularly displaced and hence such correction is necessary and then it determines the height of construction. The determined height of construction is displayed on the LCD panel 660.

From then on, whenever necessary, the CPU 650 determines by computation the distance between the laser unit and the reference beam detecting apparatus, using the computational formulas for determining the distance and those for determining the angular displacement stored in the ROM 610 and the gradient data stored in the RAM 630 and then it determines the height of construction.

A reference beam detecting apparatus according to the invention may further comprise ten keys for inputting data in addition to the switches 621 through 626 and its LCD panel 660 may be replaced by LEDs.

[Advantages of the Invention]

(1) A reference beam detecting apparatus according to the invention has a simple configuration but can accurately detect a reference height and determine the distance between itself and a reference position.

(2) A reference beam detecting apparatus according to the invention can accurately determine the distance between itself and a reference position if the reference beam detecting apparatus itself has been angularly displaced relative to the reference position.

(3) A reference beam detecting apparatus according to the invention can select a gradient of construction to significantly reduce the time required for the construction and improve the efficiency of the construction work.

What is claimed is:

1. A reference beam detecting apparatus for detecting a rotated reference laser beam emitted from a laser unit to determine the height of construction comprising:

a first light receiving section and a second light receiving section for receiving the laser beam and located to leave a space therebetween in a rotating direction of the laser beam;

a distance computing circuit for determining by computation the distance between the apparatus and the laser unit on the basis of the output signals of the first and second light receiving sections;

an inclination storing circuit to store an inclination of a construction work as input;

a height computing circuit for determining by computation the height to be used for the construction work on the basis of the output from the distance computing circuit and the value stored in the inclination store circuit; and a data display section for displaying the height to be used for the construction work on the basis of the output of the height computing circuit.

2. A reference beam detecting apparatus according to claim 1, wherein the data display section also displays the distance between the apparatus and the laser unit on the basis of the output signal of the distance computing circuit.

3. A reference beam detecting apparatus according to claim 1, further comprising an external output means for externally outputting at least part of the data displayed on the data display section.

4. A reference beam detecting apparatus according to claim 1, further comprising an angular displacement computing circuit for determining by computation the angular displacement of the apparatus relative to the laser unit on the basis of the output signals of scanning times from the first and second light receiving sections, wherein the first light receiving section shows an angle relative to the second light receiving section, and the longitudinal axial line of the first light receiving section and that of the second light receiving section are parallel to each other, and the output of distance computing circuit is corrected on the basis of the output of the angular displacement computing circuit.

5. A reference beam detecting apparatus according to claim 1, wherein the data display section also displays a shifted height of the construction work relative to that of the rotated reference laser beam.

6. A reference beam detecting apparatus according to claim 4, wherein the data display section also displays the angular displacement of the apparatus relative to the laser unit on the basis of the output signal of the angular displacement computing circuit.

7. A reference beam detecting apparatus according to claim 4, wherein the data display section also displays the angular displacement of the apparatus relative to the laser unit on the basis of the output signal of the angular displacement computing circuit.

8. A reference beam detecting apparatus according to claim 4, wherein the data display section also displays the distance between the apparatus and the laser unit on the basis of the output signal of the distance computing circuit.

9. A reference beam detecting apparatus according to claim 4, wherein the data display section also displays a shifted height of the construction work relative to that of the rotated reference laser beam.

10. A reference beam detecting apparatus according to claim 4, further comprising an external output means for externally outputting at least part of the data displayed on the data display section.

* * * * *